United States Patent [19]
Woodruff et al.

[11] Patent Number: 5,328,778
[45] Date of Patent: Jul. 12, 1994

[54] METAL-AIR CELLS COMPRISING COLLAPSIBLE FOAM MEMBERS AND MEANS FOR MINIMIZING INTERNAL PRESSURE BUILDUP

[75] Inventors: Glenn Woodruff, Atlanta; Ronald A. Putt, Marrieta, both of Ga.

[73] Assignee: Matsi, Inc., Atlanta, Ga.

[21] Appl. No.: 105,354

[22] Filed: Aug. 10, 1993

Related U.S. Application Data

[63] Continuation-in-part of Ser. No. 809,196, Dec. 16, 1991, abandoned.

[51] Int. Cl.$^5$ .................. H01M 2/12; H01M 12/06
[52] U.S. Cl. ............................ 429/27; 429/66; 429/53
[58] Field of Search ............ 429/27, 53, 54, 55, 429/66, 72, 82, 86

[56] References Cited

U.S. PATENT DOCUMENTS

| | | |
|---|---|---|
| 2,620,368 | 12/1952 | Ruben . |
| 2,629,758 | 2/1953 | Ruben . |
| 2,650,945 | 9/1953 | Herbert . |
| 2,723,301 | 11/1955 | West, Jr. et al. . |
| 2,729,694 | 1/1956 | Ellis . |
| 2,816,154 | 12/1957 | Mendelsohn . |
| 2,938,064 | 5/1960 | Kordesch . |
| 2,960,558 | 11/1960 | Marsal et al. . |
| 3,042,733 | 7/1962 | Toda et al. . |
| 3,124,487 | 3/1964 | Duddy et al. . |
| 3,177,096 | 4/1965 | Jache . |
| 3,479,387 | 2/1970 | Amiet . |
| 3,519,485 | 7/1970 | Chassoux et al. . |
| 3,598,655 | 8/1971 | Hamlen et al. . |
| 3,630,785 | 12/1971 | Whitestone et al. . |
| 3,682,706 | 8/1972 | Yardney et al. . |
| 3,716,413 | 2/1973 | Eisner . |
| 3,765,942 | 10/1973 | Jache . |
| 3,847,669 | 11/1974 | Paterniti . |
| 3,855,000 | 12/1974 | Jammet . |
| 3,871,920 | 3/1975 | Gerbier et al. . |
| 3,881,959 | 5/1975 | Tsuchida et al. . |
| 3,884,721 | 5/1975 | Tucholski . |
| 3,897,267 | 7/1975 | Tseung et al. . |

(List continued on next page.)

FOREIGN PATENT DOCUMENTS

| | | |
|---|---|---|
| 2222761 | 10/1974 | France . |
| 46-8332 | of 1971 | Japan . |
| 49-121936 | of 1974 | Japan . |
| 50-26040 | 3/1975 | Japan . |
| 50-26041 | 3/1975 | Japan . |

(List continued on next page.)

OTHER PUBLICATIONS

McLarnon et al., "The Secondary Alkaline Zinc Electrode," *J. Electrochem Soc.*, 138:2, pp. 645-664 (1991).
Merck Index, p. 302 (11th Ed.).
Kirk-Othmer, "Encyclopedia of Chemical Technology," vol. 3, pp. 402, 503-639, 663-670 (3rd Ed.).

*Primary Examiner*—Anthony Skapars
*Attorney, Agent, or Firm*—Leydig, Voit & Mayer, Ltd.

[57] ABSTRACT

This invention provides a prismatic zinc-air cell including, in general, a prismatic container having therein an air cathode, a separator and a zinc anode. The container has one or more oxygen access openings, and the air cathode is disposed in the container in gaseous communication with the oxygen access openings so as to allow access of oxygen to the cathode. The separator has a first side in electrolytic communication with the air cathode and a second side in electrolytic communication with the zinc anode. The separator isolates the cathode and the zinc anode from direct electrical contact and allows passage of electrolyte therebetween. An expansion chamber adjacent to the zinc anode is provided which accommodates expansion of the zinc anode during discharge of the cell. A suitable collapsible foam member generally occupies the expansion space, providing sufficient resistance tending to oppose movement of the zinc anode away from the separator while collapsing upon expansion of the zinc anode during discharge of the cell. One or more vent openings disposed in the container are in gaseous communication with the expansion space, functioning to satisfactorily minimize the pressure buildup within the container by venting gasses expelled as the foam collapses during cell discharge.

20 Claims, 5 Drawing Sheets

U.S. PATENT DOCUMENTS

| | | |
|---|---|---|
| 3,905,834 | 9/1975 | Harada et al. . |
| 3,918,990 | 11/1975 | Enters . |
| 3,922,178 | 11/1975 | Winger . |
| 3,961,985 | 6/1976 | Takamura et al. . |
| 4,009,320 | 2/1977 | Gerbier . |
| 4,041,211 | 8/1977 | Wiacek . |
| 4,054,726 | 10/1977 | Sauer et al. . |
| 4,135,039 | 1/1979 | Jenkins . |
| 4,145,482 | 3/1979 | von Benda . |
| 4,172,924 | 10/1979 | Warszawski . |
| 4,211,830 | 7/1980 | Chevet . |
| 4,214,044 | 7/1980 | Chevet et al. . |
| 4,220,690 | 9/1980 | Blurton et al. . |
| 4,224,736 | 9/1980 | Feldhake . |
| 4,246,324 | 1/1981 | de Nora et al. . |
| 4,248,944 | 2/1981 | Smilanich . |
| 4,282,293 | 8/1981 | van Lier . |
| 4,303,743 | 12/1981 | Réau . |
| 4,303,748 | 12/1981 | Réau . |
| 4,333,993 | 6/1982 | Gibbard . |
| 4,341,847 | 7/1982 | Sammells . |
| 4,343,869 | 8/1982 | Oltman et al. . |
| 4,389,466 | 6/1983 | Joy . |
| 4,404,266 | 9/1983 | Smilanich . |
| 4,464,446 | 8/1984 | Berger et al. . |
| 4,491,625 | 1/1985 | Sarbacher et al. . |
| 4,551,399 | 11/1985 | Despic . |
| 4,557,983 | 12/1985 | Sauer . |
| 4,565,749 | 1/1986 | van Ommering et al. . |
| 4,585,710 | 4/1986 | McEvoy . |
| 4,591,539 | 5/1986 | Oltman et al. . |
| 4,595,643 | 6/1986 | Koshiba et al. . |
| 4,608,325 | 8/1986 | Ismail . |
| 4,614,696 | 9/1986 | Ito et al. . |
| 4,640,874 | 2/1987 | Kelm . |
| 4,687,714 | 8/1987 | Oltman et al. . |
| 4,725,515 | 2/1988 | Jurca . |
| 4,740,435 | 4/1988 | Markin et al. . |
| 4,797,190 | 1/1989 | Peck . |
| 4,838,422 | 6/1989 | Gregerson . |
| 4,842,963 | 6/1989 | Ross, Jr. . |
| 4,894,295 | 1/1990 | Cheiky . |
| 4,894,300 | 1/1990 | Kugler . |
| 4,939,048 | 7/1990 | Vignaud . |
| 4,957,826 | 9/1990 | Cheiky . |
| 4,965,147 | 10/1990 | Mas et al. . |
| 4,988,581 | 1/1991 | Wycliffe . |
| 5,114,806 | 5/1992 | Chiacchio et al. . |
| 5,176,966 | 1/1993 | Epp et al. . |

FOREIGN PATENT DOCUMENTS

| | | |
|---|---|---|
| 50-26044 | 3/1975 | Japan . |
| 57-21069 | 2/1982 | Japan . |
| 57-34667 | 2/1982 | Japan . |
| 57-60660 | 4/1982 | Japan . |
| 57-69679 | 4/1982 | Japan . |
| 58-32360 | 2/1983 | Japan . |
| 58-54559 | 3/1983 | Japan . |
| 58-140968 | 8/1983 | Japan . |
| 58-145065 | 8/1983 | Japan . |
| 59-33753 | 2/1984 | Japan . |
| 59-66060 | 4/1984 | Japan . |
| 60-91562 | 5/1985 | Japan . |
| 7214308 | 5/1973 | Netherlands . |
| 143849 | of 1961 | U.S.S.R. . |
| 1246922 | 9/1971 | United Kingdom . |
| 1360779 | 7/1974 | United Kingdom . |
| 2118762 | 11/1983 | United Kingdom . |

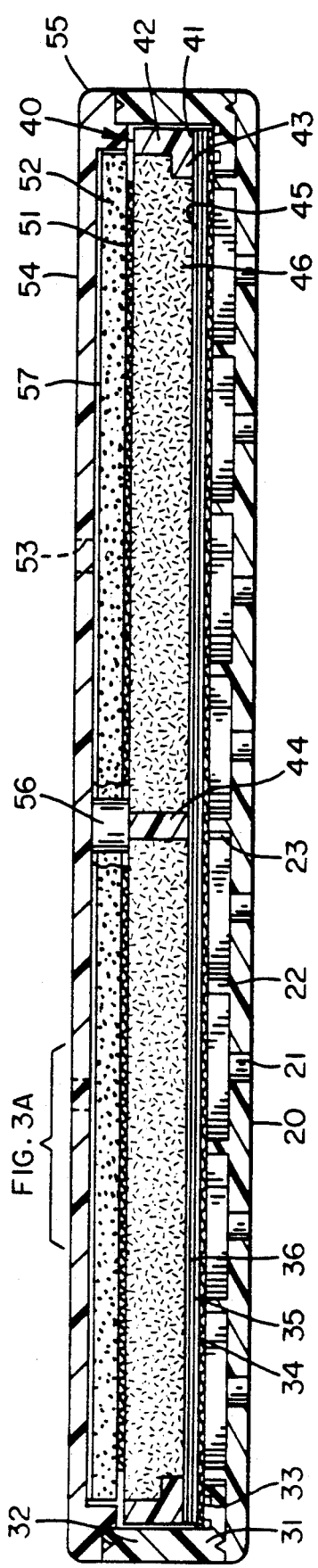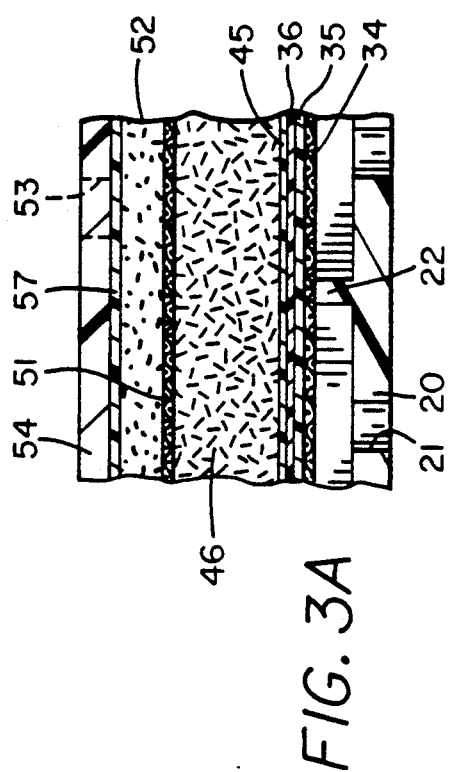
FIG. 3
FIG. 3A

METAL-AIR CELLS COMPRISING COLLAPSIBLE FOAM MEMBERS AND MEANS FOR MINIMIZING INTERNAL PRESSURE BUILDUP

This invention was made with government support under contract NAS 9-18417 awarded by NASA. The government has certain rights in this invention.

This is a continuation-in-part of U.S. patent application Ser. No. 809,196, filed on Dec. 16, 1991, now abandoned.

FIELD OF THE INVENTION

The present invention relates to metal-air cells and, more particularly, to metal-air cells having collapsible foam members disposed in an expansion space within the cell which cooperate with vents to minimize pressure increase within the cell.

BACKGROUND OF THE INVENTION

Metal-air cells typically include a metal anode, an air cathode, and a separator all disposed and supported in some sort of container. The metal anode usually comprises a fine-grained metal powder, such as zinc, aluminum, or magnesium, which is blended together with an aqueous electrolyte, such as potassium hydroxide, and a gelling agent into a paste. The separator is a porous material that allows the passage of electrolyte between the cathode and anode, but prevents direct electrical contact therebetween and short circuiting of the cell.

The air cathode is a catalytic structure designed to facilitate the reduction of oxygen. Typically, it is composed of active carbon, a binder, and a catalyst which, together with a metal current collector, are formed into a thin sheet. The air cathode also commonly incorporates a hydrophobic polymer, such as polytetrafluoroethylene or polystyrene, directly into the cathode sheet and sometimes also as a coextensive film. The hydrophobic polymer prevents electrolyte from flooding the cathode or passing through it and leaking from the cell. The container includes oxygen access openings, diffusion chambers and the like which are designed to allow sufficient oxygen to reach all parts of the air cathode.

Metal-air cells have high specific energies. In fact, zinc-air cells have the highest specific energy, up to 450 Wh/kg, of all aqueous primary systems, and high energy per unit volume as well. The components of zinc-air cells also are relatively benign.

Because of their high energy density, button cells incorporating zinc-air chemistry currently are the most popular energy source for hearing aids. The much larger majority of electronic devices, however, has higher energy requirements requiring the use of larger (i.e., greater than one ampere hour capacity) cells or batteries. Despite the electrochemical advantages of metal-air and especially zinc-air systems, carbon-zinc and alkaline manganese dioxide systems continue to dominate the much larger world market for larger primary batteries.

Many portable electronic devices, such as portable computers, also place severe constraints on battery weight and volume. In such applications, prismatic cells would be preferable over button or cylindrical cells, which latter type of cells, in general, require more space to be allocated in the device than the cells themselves actually occupy. Prismatic zinc-air cells also can be much thinner than alkaline cells of equivalent capacity.

Attempts to scale up and reconfigure zinc-air button cells to a larger, prismatic configuration, however, have generally failed. Zinc-air batteries currently are not a competitive option for use in the full spectrum of consumer and electrical products, and they represent a small portion of all primary batteries sold today.

A major problem has been in achieving an inexpensive, light-weight and easily constructed zinc-air cell configuration which is leak-proof, but which provides for efficient electrochemical discharge of the cell. Those problems are only exacerbated by the expansion of the zinc anode during the life of the battery.

That is, as a zinc-air cell is discharged, zinc is oxidized to zinc oxide, and zinc oxide has a lower density than zinc. The zinc anode therefore will expand during discharge of the cell. The amount of this expansion is reported to be from 17% up to 60%. See U.S. Pat. No. 4,687,714 to J. Oltman et al. (17%) and U.S. Pat. No. 3,855,000 to J. Jammet (60%).

This anodic expansion can cause various problems to develop. For example, Jammet '000 and Oltman '714 report that anodic expansion can cause the metal anode to directly contact the air cathode, thereby short-circuiting the cell.

U.S. Pat. No. 4,894,295 to M. Cheiky reports that the pressure buildup caused by anodic expansion can cause the container to expand, thereby causing air pockets to form between the air cathode and the electrolyte. This in turn diminishes electrolytic communication between the air cathode and the anode, reducing the battery output capacity.

Oltman '714 also reports that the internal pressure created by anodic expansion may force the air cathode so tightly against the container that complete exposure of the air cathode to oxygen may be diminished. To the extent that oxygen cannot efficiently reach all portions of the air cathode, the discharge rate of the battery is likewise diminished.

Further, as discussed in Oltman '714, the internal pressure buildup caused by anodic expansion can cause a cell to leak. While various strategies to prevent leakage have been devised, an increase in internal pressure necessarily increases the risk of leakage in any configuration. Likewise, although the degree to which the problems discussed are present will vary from design to design, all zinc-air cells must be designed to tolerate the increase in volume by the metal anode during discharge.

One such strategy, discussed in Oltman '714, is to provide free space inside the cell into which the anode may expand. When the individual anode particles expand freely into a void, however, they may not remain in physical contact with one another, and that may cause incomplete cell discharge. Oltman '714 addresses that problem by reducing the size of the expansion space and by allowing a portion of the battery container to expand as the cell is discharged.

While this approach may have some merit in button cells, such as those disclosed in Oltman '714, it has drawbacks in larger, prismatic cells. Button cells are relatively small and cylindrically shaped, comprising disc-shaped, layered electrochemical components. Typically, button cells are about ¼ to ⅜ inches in diameter and about ¼ inches or less in height. The metal anode is set initially into intimate contact with the separator during manufacture. The gelled anode, in small cells, usually is sufficiently strong to stay in position, despite the presence of a vacant expansion space and despite mechanical shocks that the cell might receive during subsequent handling.

In larger, prismatic cells, however, the strength of the gel alone may not be sufficient to hold the anode in place. The metal anode may shift into vacant expansion space, becoming separated from the desired electrochemical contact with the separator and air cathode as the cell is handled in the manufacturing and distribution process. If so, the desired cell discharge performance will be adversely impaired.

Cheiky '295 discloses a generally prismatic metal-air cell. There is no expansion space provided, and so the problem of anode separation should be minimized. The battery disclosed therein accommodates anodic expansion by incorporating a flexible bottom which can expand as the anode grows.

Expansion of the container, however, is not entirely desirable. Such expansion or distortion of the container can make it more difficult to fit the battery in the battery compartment of an electrical device. While the batteries in Oltman '714 and Cheiky '295 to a certain extent purport to minimize such problems by limiting container expansion to certain portions of the container, such an approach needlessly complicates design of the container. Moreover, the Cheiky '295 design, with its unique surface geometry, may pose further constraints on the design of battery compartments and attempts to standardize external cell or battery configurations.

Further approaches to accommodating anodic expansion are disclosed in Jammet '000 and U.S. Pat. No. 4,054,726 to H. Sauer. Jammet '000 discloses cells having a cylindrical container in which a compressible structure, such as a spring-biased plate, a frictionally slidable piston, or a compressible open-cell polyethylene foam layer or equivalent material, is situated in an expansion space located within the container. The expansion space and compressible structure are adjacent to the metal anode.

The spring-biased plate and frictionally slidable piston disclosed in Jammet '000, however, involve relatively complicated designs which drive up the cost and efficiency of manufacture. They also add significant weight to the cell and occupy a significant amount of space which consequently can neither be filled with anode paste or reserved for anodic growth. All Jammet '000 embodiments, it is stated, operate to maintain the negative electrode in the desired state of compression during use. For example, the negative electrode may expand upwardly against the opposition provided by the foam such that the electrode is maintained in the desired state of compression against the electrolyte.

In Sauer '726, metal-air button cells are disclosed in which a compressible expansion body is positioned within the zinc electrode. The placing of the expansion body within the zinc electrode has the particular advantage, it is stated, that the entire inner surface of the metallic cover remains in electrical contact with the negative electrode. Sauer also states that it is necessary that the expansion body have closed compressible pores and preferably be hydrophobic.

To ensure trouble-free operation, Sauer '726 further states that it is necessary to coordinate the compressibility of the individual structural elements of the cell. Thus, the specific compression of the expansion body must be lower than the specific compression pressure of the layer performing the air distribution and support function as well of the air electrode layer and its adjoining layer.

While the Jammet '000 and Sauer '726 structures may be satisfactory to deal with anodic expansion in cylindrical and button cells, such structures would be unsuitable for use in prismatic zinc-air cells. Thus, what was not appreciated was that the resulting increase in the internal pressure within the cell, while probably less than that encountered in the absence of an expansion space, would be significant and would create severe problems in a prismatic design.

Button and cylindrical cells, such as those disclosed in Sauer '726 and Jammet '000, are inherently more rigid structures than are prismatic cells. The containers for button and cylindrical cells also are frequently made from relatively thick steel. Consequently, button and cylindrical cells, especially those with steel casings, can withstand higher pressures without significant change in their external diameters.

The weight of the battery, however, is frequently an important consideration in cell design, especially those cells which are intended for use in portable electrical devices, such as portable computers. Fabricating a casing from steel, however, tends to add considerable weight to a larger, prismatic cell.

On the other hand, prismatic containers which are fabricated from lighter-weight materials, such as structural plastics, tend to expand and swell as internal cell pressure increases during discharge. With this expansion of the container come various problems, as noted above.

Higher internal pressures causes problems in prismatic cells in other ways as well. That is, plastic container components in theory can be sealed relatively easily by, for example, ultrasonic welding. The materials also are hydrophobic, and thus, the seals have less of a problem of electrolyte creepage, which is common with metal containers and aqueous potassium hydroxide electrolytes.

It is not always possible, however, to achieve a defect-free seal between plastic container components or between the air cathode and the container during mass production of cells. Electrolyte or anode paste which spills on the sealing surfaces, as well as imperfections in the plastic parts themselves, can lead to minor defects in a seal. Even small defects can allow electrolyte to leak as the pressure within a cell increases. Moreover, larger cells have more extensive areas which must be sealed and, therefore, a somewhat higher likelihood that a given cell will have a defect in its seal. Cell designs which have minimal internal pressure buildup in service are required so as to lessen, if not eliminate, the probability of electrolyte leakage.

It seems apparent that, for considerable time, there has existed a substantial need for larger prismatic metal-air cells, especially for thin prismatic zinc-air cells, which can satisfy the energy requirements for a wide variety of applications. It seems further apparent that a considerable amount of effort has been directed to providing suitable cells capable of providing satisfactory performance. Yet, despite recognition of the need and the considerable efforts made to date, there still exists the need for prismatic, and especially for thin prismatic metal-air cells such as zinc-air, which can provide satisfactory and reliable performance for a wide variety of commercial applications.

An object of this invention, therefore, is to provide a prismatic metal-air cell which provides more reliable electrochemical performance in service. A related and more specific object is to provide a thin prismatic zinc-air cell having satisfactorily reliable electrochemical performance in service.

It also is an object to provide a prismatic zinc-air cell which is more leak resistant, and especially, which is more leak resistant notwithstanding the presence of minor defects which can occur in the seal during mass production of cells.

It is a further object of this invention to provide a prismatic zinc-air cell which can accommodate anodic expansion during discharge without significant expansion of the cell container, even when the container is a relatively light-weight, thin-walled plastic container. A related object is to provide a zinc-air cell which can accommodate anodic expansion during discharge without significant buildup of pressure within the container.

It also is an object to provide a prismatic zinc-air cell in which the metal anode is more reliably supported against the separator to prevent separation therefrom and to maintain electrolytic communication therebetween.

It is a further object of this invention to provide a prismatic zinc-air cell which is simple in design, easy and economical to assemble and does not place excessive constraints on the types of materials from which the cell may be constructed.

Yet another object of the subject invention is to provide a prismatic zinc-air cell wherein all of the above-mentioned advantages are realized.

These and other objects and advantages of the invention will be apparent to those skilled in the art upon reading the following detailed description and upon reference to the drawings.

SUMMARY OF THE INVENTION

This invention provides a prismatic zinc-air cell including, in general, a prismatic container having therein an air cathode, a separator and a zinc anode. The container has one or more oxygen access openings, and the air cathode is disposed in the container in gaseous communication with the oxygen access openings so as to allow access of oxygen to the cathode. The separator has a first side in electrolytic communication with the air cathode and a second side in electrolytic communication with the zinc anode. The separator isolates the cathode and the zinc anode from direct electrical contact and allows passage of electrolyte therebetween.

In addition, in accordance with the present invention, an expansion chamber adjacent to the zinc anode is provided which accommodates expansion of the zinc anode during discharge of the cell. A suitable collapsible foam member generally occupies the expansion space, providing sufficient resistance tending to oppose movement of the zinc anode away from the separator while collapsing upon expansion of the zinc anode during discharge of the cell. One or more vent openings disposed in the container are in gaseous communication with the expansion space, functioning to satisfactorily minimize the pressure buildup within the container by venting gasses expelled as the foam collapses during cell discharge.

Preferably, the air cathode, separator, zinc anode, and foam member are disposed in layers extending generally parallel to the top and bottom walls of the container and substantially continuously between the side walls of the container. Hydrophobic membranes preferably cover the vent openings in the container. The collapsible foam member preferably is a closed cell foam, and is sized to provide a predetermined amount of pressure on the zinc anode.

It will be appreciated, therefore, that the design of the novel cells makes it possible to fabricate larger prismatic zinc-air cells which have more reliable electrochemical performance and avoid many of the problems associated with existing metal-air cells. For example, the foam member can collapse as the anode expands during discharge. Gasses forced out of the foam member as it is compressed escape through the vent holes. The cells thereby accommodate anodic growth without any undue increase in internal pressure.

Thus, the metal-air cells of the present invention also avoid the various problems associated with high internal cell pressures, such as expansion of the container, distortion of the internal cell components, and increased susceptibility to leakage, which can diminish the performance of a cell and are particularly troublesome in large prismatic cells. The low internal pressure of the cells of this invention also makes such cells more adaptable to plastic containers, which are desirable in large cells because of their low weight, but which are poorly suited to conventional designs having high internal cell pressures.

The inclusion of the foam member, preferably a closed cell foam member, also will resist any drastic movement of a gelled zinc anode paste away from the separator, such as otherwise might occur when cells, especially large cells, are subject to rough handling. Moreover, the foam member may be preloaded during assembly of a cell to bias the anode mass toward the separator. Thus, more reliable electrolytic contact between the anode and separator may be established and maintained during the service life of the cell.

Further, it will be appreciated that the foam member and vent openings cooperate to accommodate anodic expansion with little increase in pressure in a very simple and effective manner. The container does not have to expand, so it is possible to design a relatively simple container, making it easier to coordinate the dimensions of the cell as well as the cell compartment into which it will be installed. Likewise, the simplicity of the design contributes to easier and more economical manufacture of the cell.

In summary, it is believed that the present invention makes the difference between the success and failure of a thin-wall plastic prismatic zinc-air cell. The present invention thus achieves for the first time a commercially viable thin-wall plastic prismatic zinc-air cell.

BRIEF DESCRIPTION OF THE DRAWINGS

FIG. 3 is a cross-sectional view taken generally along the plane defined by line 3—3 of the cell 10 shown in FIG. 1, showing in particular the internal components of the cell in assembled position;

FIG. 3A is an enlargement of the area denoted by bracket 3A in FIG. 3;

DETAILED DESCRIPTION OF THE INVENTION

Figure 1:
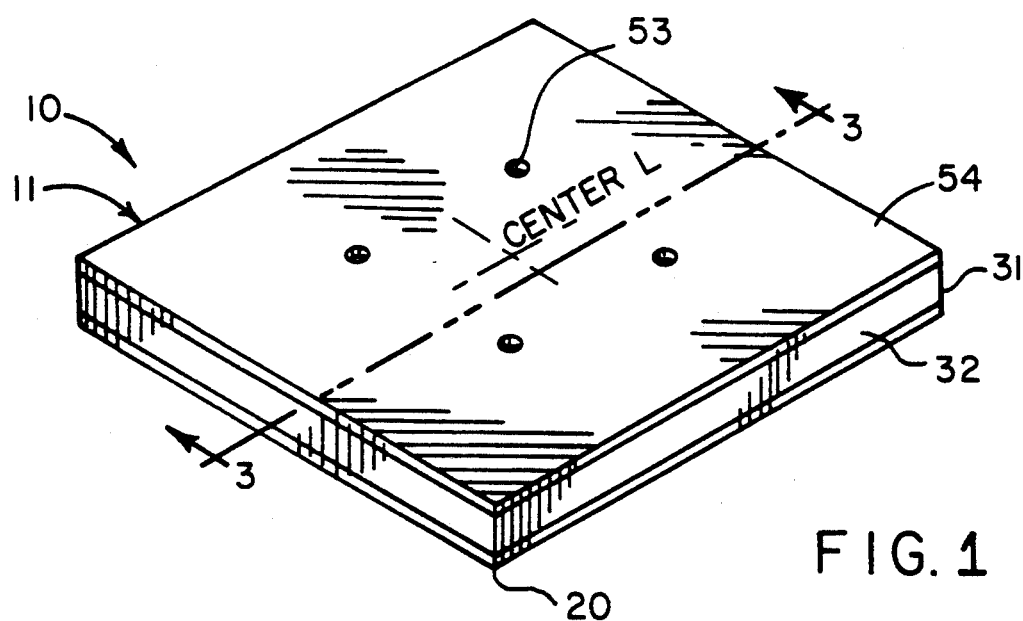
FIG. 1 is a perspective view of a preferred embodiment of the metal-air cells of the subject invention, showing in particular a zinc-air cell 10 and an array of vent openings in the top of the cell container.

FIGS. 1-4 illustrate a preferred embodiment of the subject invention. As seen in FIG. 1, the cell 10 comprises a prismatic container 11. The container 11 has a generally solid-rectangular shape having bottom, side, and top walls. The approximate dimensions of the cell 10 are 3.6"×3.6"×0.423". As compared to button cells, which are the most common configuration for zinc-air cells, the cell 10 is very large. Button cells typically measure only about ¼" to ⅜" in diameter and about ¼" or less in height. Accordingly, cells of the subject invention incorporate greater amounts of active zinc, thus they have greater capacity and are more suitable for electrical devices having higher energy requirements.

Moreover, the cell 10 has a very simple surface geometry. That makes it easier to design and build battery containers in electronic devices. A prismatic shape and simple surface geometry also enable more effective space utilization both within the cell and within an electronic device and makes it easier to assemble batteries using two or more individual cells.

It should be understood that the terms "top", "bottom", "side", and the like as used herein are relative terms and are employed for convenience in describing the various embodiments of this invention. In service, the novel cells can be used in any orientation.

Figure 2:
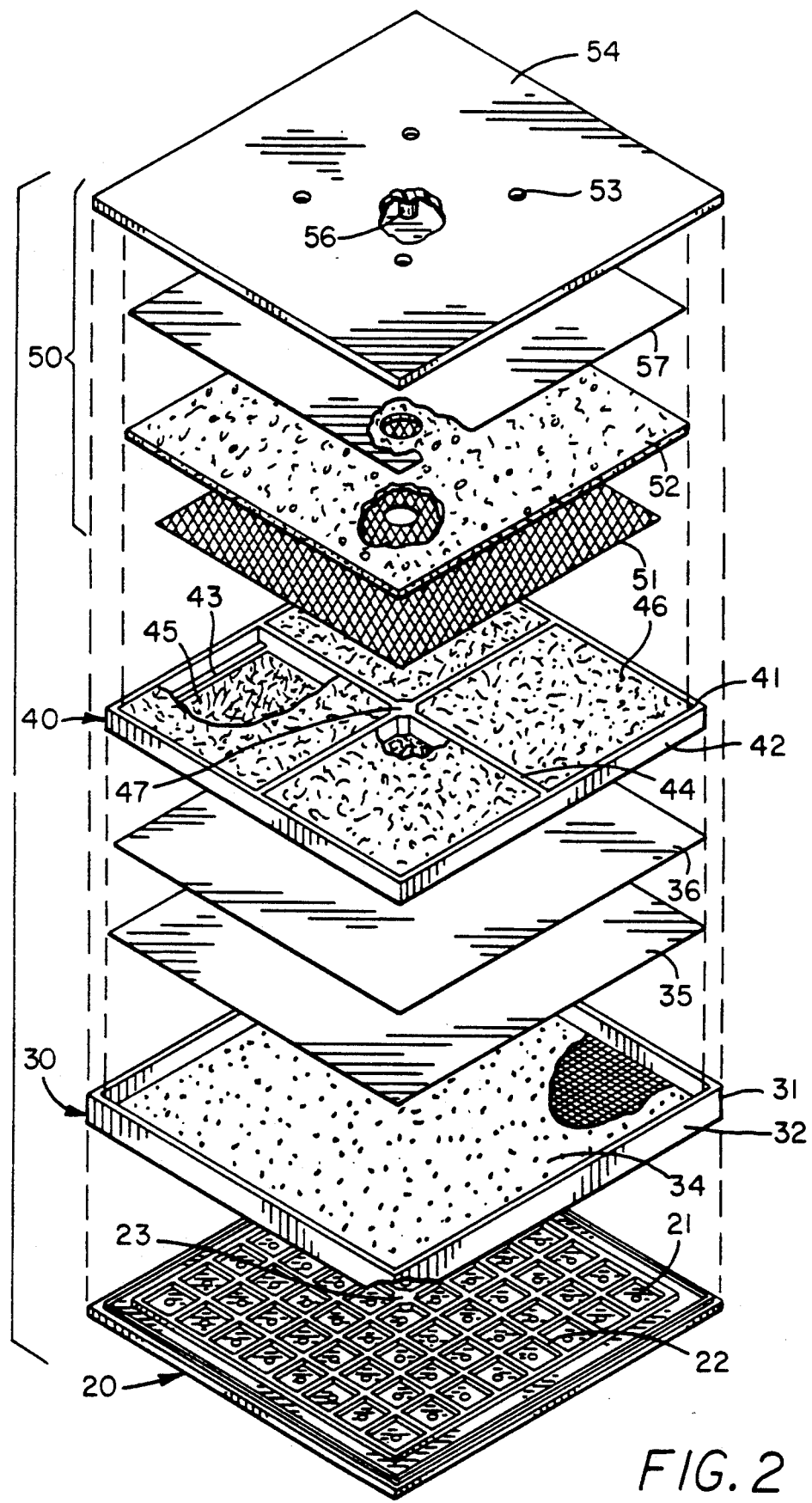
FIG. 2 is an exploded perspective view of the cell 10 shown in FIG. 1 showing further details of the internal components of the cell and the components of the cell container.

The internal components of this preferred embodiment of the cells of this invention, as shown in FIGS. 2, 3, and 3A, are disposed generally in flat layers extending generally parallel to the top and bottom walls of the container 11 and substantially continuously between the side walls of the container 11. Those internal components include, going from the bottom of the cell 10 up, an air cathode 34, a primary separator 35, an oxygen impermeable membrane 36, an anode assembly 40 comprising an anode frame 41, a supplemental separator 45, and anode 46, an anode current collector 51, a foam member 52, and a hydrophobic membrane 57. The container 11 in this preferred embodiment is fabricated from three parts, a bottom 20, a cathode frame 31, and a top 54, and substantially encloses and supports the internal components of the cell 10.

As will be appreciated readily by those skilled in the art, the cathodic and anodic material, in this cell oxygen and zinc, must not come into direct contact. Otherwise, zinc will be directly oxidized and the electrochemical potential of the cell will be wasted. The cell reaction instead must proceed by various intermediate reactions involving catalytic reduction of oxygen at the cathode, migration of intermediate species through the electrolyte solution, and ultimately oxidation of zinc at the anode.

Thus, there must be electrolytic communication between the air cathode 34 and the anode 46 and through the primary separator 35, oxygen impermeable membrane 36, and supplemental separator 45 which are interposed therebetween. That is, electrolyte must be able to migrate between the air cathode 34 and zinc anode 46. To the extent that electrolytic communication is diminished, performance of a cell suffers. As will become apparent from the discussion herein, however, cells of the subject invention establish and maintain effective electrolytic communication in the cell.

Figure 4:
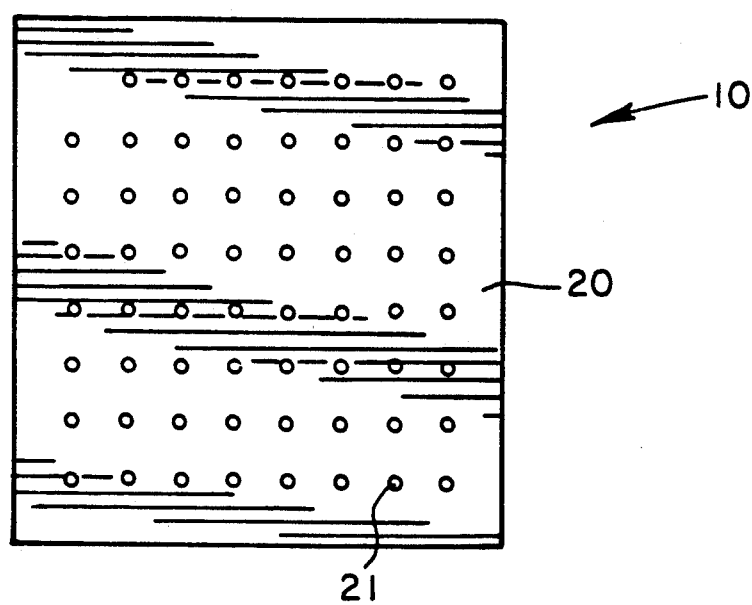
FIG. 4 is a bottom plan view of the cell 10 shown in FIG. 1, showing in particular an array of oxygen access openings in the cell container.

As best seen in FIGS. 3 and 4, a plurality of relatively small oxygen access openings 21 are uniformly distributed in the bottom 20 of the container 11. The oxygen access openings 21 allow air to pass through the bottom wall of the container 11 ultimately into contact with the air cathode 34, thereby providing a source of oxygen to the cell.

The bottom 20 of the container also is provided with a grid-like pattern of intersecting ribs 22 which extend across the interior surface of the bottom 20 and upwards therefrom into contact with the lower surface of the air cathode 34. Those ribs 22, together with the interior surface of the bottom 20 of the container 11, define a plurality of oxygen diffusion chambers, each of which is in gaseous communication with an oxygen access opening 21 and is immediately adjacent to a portion of the lower surface of the air cathode 34.

The oxygen diffusion chambers ensure more efficient, uniform diffusion of oxygen into the air cathode 34 than would occur if the air cathode 34 were mounted immediately adjacent the bottom 20 container 11. Under such circumstances, relatively large portions of the surface area of the air cathode would not be directly exposed to atmospheric oxygen and the performance of the cell could be diminished. If a cell has a diffusion chamber, however, the number and size of oxygen access openings may be reduced. The container wall, therefore, will be stronger and provide greater protection for the air cathode from mechanical damage. Accordingly, cells of the subject invention preferably incorporate an oxygen diffusion chamber.

The cell 10 has 64 circular oxygen access openings 21, each of which are approximately 1/16" in diameter. Likewise, there are 64 diffusion chambers, one chamber associated with each oxygen access opening 21. This configuration has been found to provide good performance in cells constructed as shown in FIGS. 1-4, but other cells may require greater or less circulation.

In general, oxygen access openings and diffusion chambers should allow enough oxygen to reach the air cathode to satisfy the electrochemical requirements of a cell, bearing in mind that excess air access will increase evaporation of water from the cell. The precise number, size, shape, and arrangement of oxygen access openings and the size and configuration of diffusion chambers in cells of the subject invention can be varied to achieve whatever level of circulation is desired, as is known in this field.

As noted, the upper surfaces of the ribs 22 abut the air cathode 34, thereby providing support for the air cathode 34. The cells of the subject invention preferably incorporate some means of providing such support. Otherwise, the air cathode may tend to bow or shift away from the anode 46, disrupting electrolytic communication therebetween. The ribs 22 are an efficient means of providing such support, while also defining oxygen diffusion chambers, and, at the same time, greatly reinforce the bottom 20 of the container 11. Other means of supporting the air cathode 34, however, may be utilized. For example, a loose-woven, polyethylene screen or layer or an open-cell foam member may be disposed in an oxygen diffusion chamber which extends substantially between the side walls of the container.

As best shown in FIGS. 2 and 3, the air cathode 34 is mounted across the cathode frame 31 proximate to its lower end on ledges 33 provided for that purpose. The air cathode 34 serves to catalyze the reduction of oxygen. Preferably, as does the air cathode 34 in the cell be, the air cathode in cells of the subject invention also provides a barrier to the passage of electrolyte.

Suitable air cathodes may be fabricated from conventional materials by conventional methods, for example, by pressing a powder mix of active carbon, catalyst, and binder onto a metallic current collector. Electrolyte barriers can be formed by incorporating hydrophobic polymer particles into the cathode material or by mounting a film of hydrophobic polymer coextensively with the air cathode. Suitable air cathode materials also are commercially available, for example, as gas diffusion electrodes from Eltech Research Corp., Fairport Harbor, Ohio.

Any separator or separator system useful for metal-air cells may be used, and many are known. According to the illustrative preferred embodiment, a three-part separator system is utilized.

As shown in FIGS. 2, 3, and 3A, primary separator 35 is immediately adjacent and in intimate electrolytic communication with the air cathode 34. The primary separator 35 serves to isolate the air cathode 34 and the anode 46 from direct electrical contact, while allowing electrolyte to pass therebetween. The primary separator 35 also provides an additional barrier to migration of peroxide ions. Peroxide ions are formed at the air cathode 34 and, if those ions migrate to and react with zinc in the anode 46, the electrochemical efficiency of the cell 10 will be diminished. The primary separator 35 may be fabricated from a variety of materials which are well known to workers in the art as being suitable for such purposes. Such materials include, for example, polyvinyl alcohol or polyamide papers.

As will be discussed in greater detail hereinafter, the anode assembly 40 incorporates a supplemental separator 45. Supplemental separator 45 may be of like construction and composition as the primary separator 35 or may be made from any other material satisfactory for metal-air cell separators. As does primary separator 35, the supplemental separator 45 serves to isolate the air cathode 34 and anode 46 from direct electrical contact, yet allows passage of electrolyte therebetween. The supplemental separator 45 further, and importantly, serves in the preferred embodiment as, in effect, a support for the anode material as will be discussed hereinafter.

The other part of the illustrative and preferred separator system comprises an oxygen impermeable membrane 36 positioned immediately adjacent to the primary separator 35. Cells of the subject invention optionally, but preferably, incorporate oxygen impermeable membrane 36 or its equivalent because inclusion of this component contributes to greater utilization of zinc, especially in large cells. The advantages and manner of using oxygen impermeable membranes is described in greater detail in the application entitled Metal-Air Cells Having Improved Anode Utilization, filed concurrently herewith and the disclosure of such membranes and their use in metal-air cells is incorporated herein by reference.

As shown in FIGS. 2 and 3, the anode assembly 40 is positioned immediately adjacent to the oxygen impermeable membrane 36. This assembly 40, as previously noted, comprises anode frame 41, supplemental separator 45, and anode 46. The anode frame 41 is a generally rectangular, open frame-like structure having four peripheral members 42 and a pair of intersecting cross members 44. The supplemental separator 45 is mounted across the anode frame 41 proximate to its lower end on ledges 43 provided for that purpose. Supplemental separator 45 extends substantially continuously between the peripheral members 42. The anode frame 41 and supplemental separator 45 thereby define a trough. The anode 46 is a gelled paste which is carried in the trough in intimate electrolytic communication with the top side of the supplemental separator 45. The anode assembly 40 is disposed in the container such that the bottom side of the supplemental separator 45 is in electrolytic communication with the oxygen impermeable membrane 36 and, ultimately, the top side of the air cathode 34.

Suitable gelled zinc anode pastes 46 comprise zinc, an aqueous electrolyte, and a gelling agent. Small amounts of other additives may be incorporated in the paste to impart various physical and electrochemical properties.

The gelled zinc anode paste 46 also, optionally, but preferably, incorporates an inert, insoluble, anode volume stabilizer, especially if the size of the cell is relatively large. It is believed that pastes incorporating such anode volume stabilizers provide more reliable electrolytic communication between the anode 46 and supplemental separator 45 as the cell is discharged in use. The advantages and manner of using such anode volume stabilizers is described in detail in the above referenced application entitled Metal-Air Cells Having Improved Anode Utilization and the description and use of such anode volume stabilizers is incorporated herein by reference.

The precise components of the gelled zinc anode paste 46 and their proportions, however, may be varied as desired. It will be appreciated that a wide variety of gelled zinc anode pastes may be used to advantage in cells of the subject invention.

The cell 10 also preferably comprises one or more anode support members, exemplified by a pair of intersecting members 44 in the anode frame 41, which are embedded in the gelled zinc anode paste 46 and extend generally perpendicular thereto. It will be appreciated that anode support members further assist in maintaining more reliable electrolytic communication between the anode 46 and the supplemental separator 45. That is, even though gelled zinc anode paste is quite viscous, it is believed that the paste may be susceptible to being dislodged from contact with a separator by mechanical shocks and impacts to a cell, particularly when the cell is a large prismatic cell. The anode support members tend to prevent such shifting and the creation of air pockets between the anode and separator which, as noted above, have deleterious effects on the discharge rates and capacity of the cell.

The intersecting members 44 have been found to provide effective support for the anode 46, are easily fabricated, and utilize minimal material. In general, anode support members should be designed to provide sufficient support, while bearing in mind that such supports do occupy space which otherwise could be utilized for anode material. Accordingly, it will be appreciated that suitable anode support members may have various configurations in addition to that exemplified by intersecting members 44, for example, serpentine or zig-zag shaped members. Likewise, anode support members may be anchored to the container, for example, to its side or top walls.

The cells of the subject invention preferably utilize the anode assembly 40 shown in FIGS. 1-4 or its equivalent. Gelled zinc anode pastes in general provide efficient anodic material, and the anode assembly 40 offers various advantages in zinc-air cells having gelled zinc anodes. The advantages and manner of using such anode assemblies is described in greater detail in the application entitled Metal-Air Cells Having Improved Anode Assemblies and Methods for Their Fabrication, filed concurrently herewith, and the disclosure of that application regarding such anode assemblies is incorporated herein by reference.

It will be appreciated, however, that other means of supporting and carrying a gelled zinc anode may be used in cells of the subject invention. Likewise, such cells may use other anodic materials, such as zinc pellets. Such anode designs and compositions, as are compatible types of separators, electrolyte, current collectors, and the like, are well known to workers in the art.

The anode current collector 51 is embedded in the anode paste 46 as can be seen in FIGS. 2, 3, and 3A. Suitable collectors may be provided by metal sheets and mesh, and a variety of such collector materials are known to workers in the art and may be used in cells of the subject invention.

An expanded mesh of double-pulled copper foil, however, is especially preferred. The cost of such material is reasonable, and copper is an excellent conductor. Moreover, the double-pulled copper foil mesh has a high surface area to volume ratio, and the mesh has a large void volume. Thus, the mesh may be deeply embedded in a gelled zinc anode paste without displacing a significant amount of paste. The depth of the grid, usually about 0.020-0.025 inch, also makes it easier, as compared to more shallow current collectors, to establish contact with the anode paste if slight areas of clearance exist between the gelled zinc anode paste and foam member 52.

As shown in FIG. 3, the cells of the present invention include an expansion space defined at its bottom by the upper surface of the anode assembly 40, on its side by those portions of the inner surfaces of the cathode frame 31 extending upwards beyond the upper surface of the anode assembly 40 and the inner surfaces of a skirt 55 of the top 54, and on its top by the inner surface of the container top 54.

In accordance with a principal aspect of the prismatic cells of the present invention, a system is utilized which not only effectively accommodates the anodic expansion which takes place during the service life of the cells, but also eliminates, or at least substantially minimizes, problems such as electrolyte leaking and the like by minimizing pressure buildup as the cell is discharged in service. To this end, the system employed in this invention comprises a foam member rigid enough to satisfactorily oppose movement of the zinc anode away from the desired electrolytic contact with the separator while, at the same time, collapsing adequately to minimize, in cooperation with vent openings, any pressure buildup within the cell as the cell is discharged in use. In this fashion, the cells of the present invention not only provide satisfactory electrical performance, but also are subject to minimal leakage. It is thus the cooperation between the collapsible foam member and the vent openings which impart the superior performance characteristic of the cells of the present invention.

As is shown in the exemplary embodiment of and as best seen in FIGS. 2 and 3, collapsing foam member 52 is configured and disposed in the container 11 such that it generally occupies the expansion space. Its lower side is adjacent to the upper side of the anode 46, with the hydrophobic membrane 57 interposed between the top side of the foam and the inner surface of the container top 54.

The expansion space provides an area into which anodic growth can occur. As the anode 46 expands during discharge, the collapsing foam member 52, which otherwise occupies the expansion space, is compressed. Gasses within the foam member 52 are likewise forced to evacuate from the foam member 52 and exit the cell 10 via vent openings 53 disposed in the container top 54, thereby minimizing pressure increases within the container 11.

The size of the expansion chamber preferably is the minimum necessary to accommodate the expected amount of anodic growth (usually about 20% or so of the initial anode volume) and the compressed foam member 52. It also preferably is configured to allow for uniform expansion of the anode 46. The precise size and configuration of the expansion chamber, however, may be varied as desired.

The cell 10 has 4 circular vent openings 53 uniformly distributed across the container top 54, each of which has a diameter of $\frac{1}{8}$". This configuration has been found to provide good performance in cells constructed as shown in FIGS. 1-4. The precise number, size, and configuration of the vent holes, however, may be varied as desired, provided the vent holes allow sufficient egress of gases from the foam member 52 to avoid an undue increase in the internal cell pressure, as may be appreciated from the discussion herein.

The collapsing foam member 52 should be chemically and physically stable in the presence of electrolyte. Also, the collapsible foam member 52 should not absorb electrolyte and should provide a barrier to the migration of electrolyte from the anode 46. Otherwise, electrolyte may be depleted from the anode 46.

The compressibility of the collapsible foam member 52 is such that it contributes to meeting two somewhat competing objections as previously discussed. First, the foam member 52 should be sufficiently compressible to accommodate anodic expansion without undue resistance. Otherwise, the cell may experience an undue increase in internal pressure. On the other hand, the foam member 52 should be firm enough to oppose movement of the anode 46 within the cell 10. Thus, electrolytic communication between the anode 46 and separator 45 is reliably maintained.

The sizing of the foam member 52 relative to that of the expansion space may be varied as desired. However, as may be appreciated, it will generally be preferred to size the foam member such that a preloading condition results. In other words, when in the assembled cell prior to use, the foam member 52 will tend to slightly bias the anode against the separator.

It has been found that the various functions required for the collapsing foam member may be satisfied by a Volara ® closed cell, irradiation cross-linked, polyolefin foam (Voltek Corp, Lawrence, Mass., Coldwater, Mich.). This material has the following characteristics, as determined by ASTM D3575 (1991): density - 2 lb/ft$^3$; compression strength at 25%-6.0 lb/in$^2$; compression strength at 50%-15.0 lb/in$^2$; compression set - 21% original thickness.

A closed-cell foam is preferred, not only because an effective electrolyte barrier is provided, but also because gasses do not readily egress from the foam layer, providing good resistance against sharp, sudden forces, such as might occur when the cell is dropped. We have found, surprisingly, that despite the closed-cell nature of the foam, the gasses held in the cells are released to the atmosphere when the foam is subjected to prolonged compression beyond its elastic limit, as occurs in the cell during discharge. Since internal gasses slowly diffuse out of the foam under prolonged pressure, closed-cell foams are able to serve the dual purpose of supporting the anode against movement in the cell while accommodating its growth during cell discharge.

While the closed cell polyolefin foam Volara® material is the preferred material for the collapsing foam member, other materials should, as may be appreciated, be capable of satisfying the criteria described herein. Indeed, in view of the discussion herein, those skilled in the art should be capable of selecting other satisfactory materials. Further, the appropriateness of any candidate material can be readily determined simply by assembling and testing a cell using the foam member selected. Satisfactory materials are those which yield the desired electrical performance while avoiding internal pressure buildup of a level that results in an electrolyte leakage problem.

Further, while it is preferred to utilize closed cell foams, open cell foams should be capable of use, especially those open cell foams having surface skins. Of course, the skins should not be so consolidated as to unduly prevent egress of internal gasses from the interior of the foam.

It will be appreciated, therefore, that the cells of the subject invention accommodate anodic growth without a significant increase in the internal pressure of the cell. In the absence of vent openings 53, it has been found that gasses contained in the foam member 52 apparently do not escape from the cell because the internal pressure builds up to a level where electrolyte leakage becomes a problem. It may be that the gelled zinc anode paste 46 and the oxygen impermeable membrane prevents such gasses from exiting through the oxygen access openings 21. At any rate, the vent openings 53, however, provide means for releasing the gas and pressure does not unduly buildup within the cell during discharge.

Thus, cells of the subject invention are able to avoid the many problems associated with high internal cell pressures, such as expansion of the container, distortion of the internal cell components, and increased susceptibility to leakage. Such problems can diminish significantly the performance of a cell, especially flat prismatic cells having plastic containers.

Figure 5:
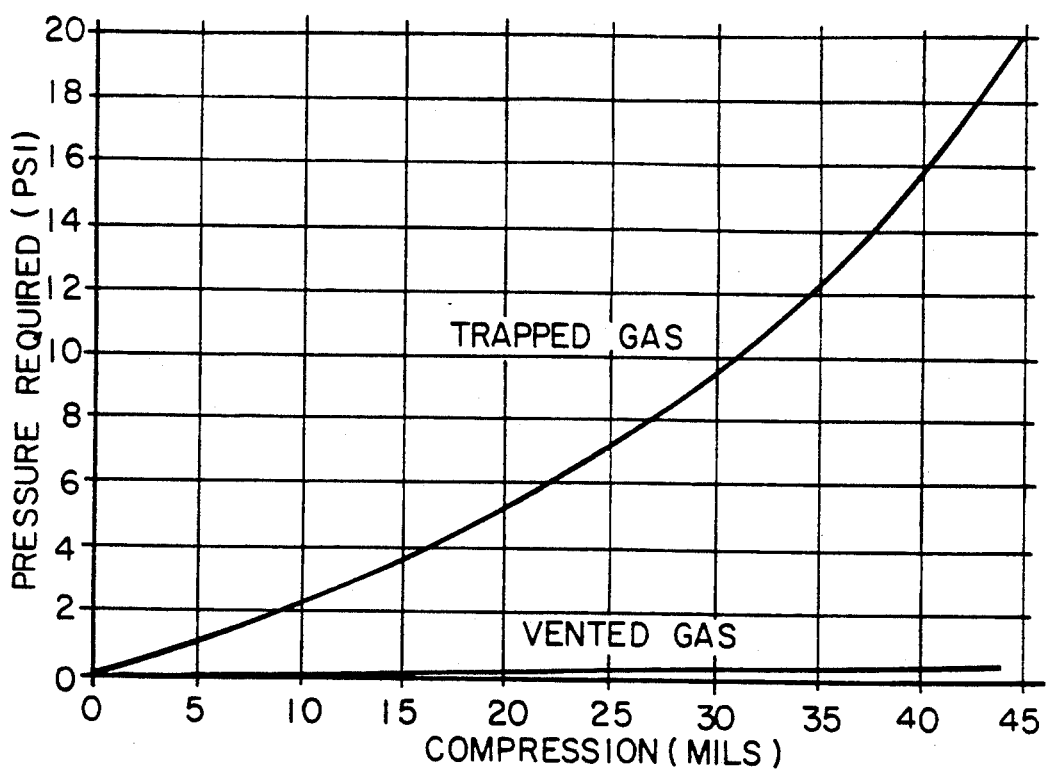
FIG. 5 is a graph of pressure versus compression and illustrating the significance of the present invention in alleviating pressure buildup within a prismatic zinc-air cell.

FIG. 5 is a graph which visually demonstrates why it is considered that the present invention makes the difference between the success and failure of a thin-walled plastic prismatic zinc-air cell. The curve denoted "Vented Gas" was obtained from a compression test using a one centimeter square piece of Volara® foam about 0.094 inch thick. The test was conducted in an open environment so that gasses within the foam would be vented to the atmosphere as would occur in the present invention. As can be seen, as the compression of the foam increases, as would occur during discharge of the cell, the pressure increase which occurs is minimal. This test is consistent with experience in using the cells of the present invention; reliable performance is obtained while leakage problems are essentially eliminated.

On the other hand, in marked contrast, the curve denoted "Non-Vented Cell" represents the internal pressure buildup that is calculated, using Boyle's Law ($P_1V_1=P_2V_2$), would occur as compression of the foam takes place. This substantial internal pressure buildup would create significant leakage problems; and, regardless of whether the cell actually functions by literally following the curve illustrated in FIG. 5, thin-walled, plastic prismatic zinc-air cells not incorporating the present invention, it has been found, experience so much internal pressure buildup that electrolyte leakage problems and the like result.

Moreover, it will be appreciated that the cells of the subject invention are able to achieve significant improvement and performance in a simple and economical manner. Suitable foam members and vent openings are easily fabricated, and they avoid the complexity of many prior art cells. Further, the foam member adds little extra weight to the cell and, when fully compressed, occupies a minimal amount of space.

As seen in FIGS. 2, 3, and 3A, the hydrophobic membrane 57 is preferably interposed between the foam member 52 and the inner surface of the top 54 and covers the vent openings 53. The hydrophobic membrane 57 is generally gas permeable so as to allow gas to be vented from the foam member 52 as it compresses during discharge of the cell. On the other hand, the hydrophobic membrane 57 is substantially impermeable to water, thus preventing, or at least substantially minimizing liquid loss from the cell. While a membrane is illustrated all that is required is that such a membrane be positioned between the foam member 52 and the vents, sized to cover the vent openings.

The hydrophobic membrane 57 may be fabricated from a variety of synthetic polymer membranes, such as those composed of polypropylene and polytetrafluoroethylene (PTFE). The properties of such films are well known to workers in the art, and such films are available commercially, for example, from Celanese Corporation (Celgard 2400 polypropylene film) and W. L. Gore and Associates, Elkton, Md. (Goretex PTFE film).

The various structural components of the cell, as exemplified by bottom 20, cathode frame 31, anode frame 41, and top 54, may be fabricated from any material which is compatible with the electrochemistry of the cell. Various materials are known for metal-air cells and may be used in cells of the subject invention.

If the cell is large, however, weight considerations make the use of structural plastics highly preferable and, if the cell accommodates an expansion chamber and vent openings, structural plastics are a practical alternative. Such plastics include polyethylene, polypropylene, and nylon. Acrylonitrile-butadiene-styrene plastics are especially preferred for their attractive mechanical and thermal processing characteristics, as well as being cost effective.

Suitable plastic components may be fabricated by injection molding or other conventional methods. The air cathode, separator, and any additional separators or membranes, may be mounted to the container parts by conventional adhesives, such as hot-melt or epoxy adhesives. The container parts preferably include ledges and beads to facilitate the mounting process. Likewise, the container parts may be sealed by ultrasonic welding or by any other conventional method, and these container parts may be provided with various stops, beads, and the like to facilitate final assembly and sealing of the container.

In particular, as will be understood more readily by reference to FIG. 4, the cell 10 preferably is fabricated by mounting the air cathode 34 on the cathode frame 31 by hot-melt or epoxy adhesives. Suitable leads and terminals (not shown) are connected to the current collector of the air cathode 34 to form a cathode assembly 30. Appropriate leads and terminals are known and may be used.

The hydrophobic membrane 57 is mounted to the top 54 by suitable adhesives, and likewise the foam member 52 is secured to the hydrophobic membrane 57. Thereafter, the current collector 51 is secured to the foam member 52 by touch-melting of the foam (i.e., by lightly pressing the collector 51 to the foam with a hot tool) and suitable leads and terminals (not shown) are provided to form a top assembly 50.

The separator 45 is mounted by suitable adhesives to the anode frame 41. The trough then is loaded with paste to form the anode assembly 40. Preferably, a slight excess of paste is dispensed into the trough, and the excess is scraped off. The scraping tends to pack the paste into the trough, and thus, the correct amount of paste is more reliably dispensed.

The trough preferably is loaded with paste in an area remote from where sealing and joining of other battery components is performed. Once it is assembled, the anode assembly 40 does not have to be sealed in a leak-tight fashion to any other component of the cell 10. On the other hand, those parts of the cell 10 on which leak-tight seals must be formed are kept clean and dry, and such seals are more reliably formed.

The primary separator 35, oxygen impermeable member 36, and anode assembly 40 are loaded into the cathode assembly 30. The bottom 20 and top assembly 50 are positioned for final sealing, for example, by ultrasonic welding. It will be noted that bottom 20, anode frame 41, and top 54 are provided with, respectively, post post 47, and post 56. When the cell is finally assembled, those posts 23, 47, and 56 abut and are joined together to provide further reinforcement for the cell. After final assembly, the cell also is preferably sealed with a thin, heat sealable, gas impermeable film to protect the cell from exposure to the atmosphere until it is placed in service, as is known.

The invention is further described by reference to the following examples. These Examples are not intended to limit the scope of the invention; rather, they are presented merely to facilitate the practice of the invention by those of ordinary skill in the art and to further disclose the inventors' best mode of doing so.

EXAMPLE 1

This Example shows the assembly and testing of a prismatic zinc-air cell of the present invention. The cell was approximately 0.545 inches square and 2.00 inches long, approximately equal to the diameter and length, respectively, of an AA alkaline cell.

An anode tray upper portion was machined from a block of solid acrylic plastic sheet stock to obtain side and end walls 0.500 inches high by 0.04 inches thick, with a 0.125 inch wide by 0.040 inch thick rim around the perimeter of the top opening and an open bottom.

The tray bottom was cut from a sheet of acrylic plastic 0.04 inches thick, to a width of 0.545 inches and a length of 2.0 inches. Three 0.125 inch diameter holes were drilled through the tray bottom, along the center-line of width and equidistant from one another and the ends of the tray bottom.

A 0.545 inch wide by 2.0 inch long piece of gas permeable hydrophobic material (Celgard 2400) was superposed on the tray bottom, which was, in turn, placed firmly and squarely against the bottom edges of the upper portion of the tray, and cemented in place using polyamide cement (Henkel GAX 11-972).

A 0.055 inch diameter pilot hole was drilled through one end of the anode upper tray, followed by a 0.128 inch countersink into which was placed an O-ring (Parker 2-002), into which was inserted a 0.054 inch diameter by 2.00 inch long brass rod, so that it extended through the anode compartment nearly to the opposite end wall. This was the anode current collector.

A 0.456 inch wide by 1.92 inch long by 0.188 inch thick piece of closed cell collapsible plastic material (Volara ® 2A) was then inserted into the tray and placed snugly against the Celgard lining of the tray bottom interior.

The tray cavity was then filled with a zinc anode consisting of battery grade zinc powder (Overpelt Grade 308, amalgamated with 3% by weight mercury), premixed 70% by weight with a solution of 35% potassium hydroxide in water and 0.6% by weight of a gelling agent (Carbopol 940). The cavity was filled so that the upper surface of the zinc anode mixture was flush with the top surface of the anode tray.

A 0.420 inch wide by 1.875 inch long piece of separator material (Chicopee 7601) was placed on top of the tray and anode material so that about 0.060 inch of the tray rim was exposed. The exposed portion of the rim was coated with a polyamide cement (Henkel GAXZ 11-972) and then a 0.545 inch wide by 2.00 long piece of air cathode material (Electromedia AE-20) was placed onto the rim and held firmly in place until the cement had set.

A 0.500 inch wide by 2.25 inch long strip of cathode current collector material (Delker 0.028 inch thick expanded nickel foil) was placed on top of the air cathode, with the extra length folded over the end of the tray edge opposite that containing the brass anode rod. A 0.500 inch wide by 2.00 inch long piece of 0.040 thick gas permeable hydrophobic open cell material (Porex 4765) was placed on top of the current collector, and the entire tray length was wrapped on all four sides with a piece of 0.005 inch thick adhesive-backed, heat-shrinkable plastic material (Avery Metalized Vinyl-Faced Sheet Stock) 2.00 inches wide by about 2.25 inches long. Material of this type is commonly used for the exterior wrapping of alkaline AA cells. Heat was then applied with a hot air gun to shrink the label tightly around the assembly.

The completed cell weighed 0.8 ounces. A comparable conventional AA alkaline cell weighs 0.9 ounces.

The cell was then placed across 20 ohm resistor and its voltage was recorded versus time until a lower cutoff voltage of 0.9V was reached.

A conventional AA cell (manufactured by Duracell) was then placed across a 20 ohm resistor and its voltage was recorded versus time until the 0.9V cutoff was reached.

Figure 6:
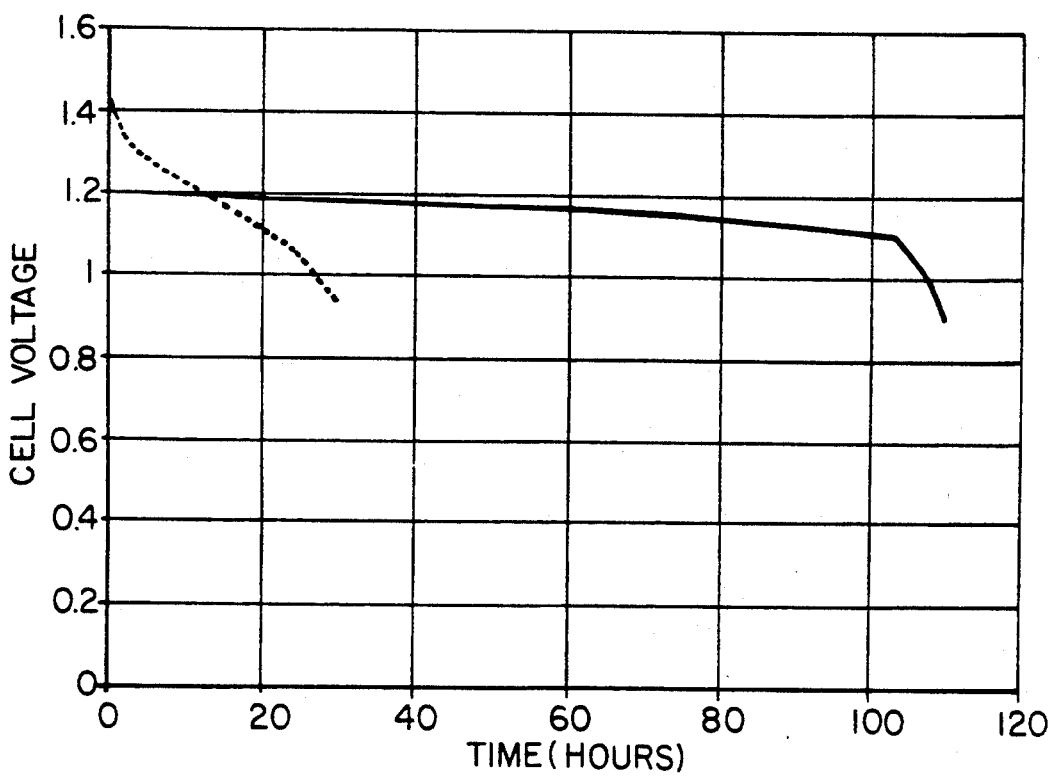
FIG. 6 is a graphical comparison of the discharge characteristics of a commercial AA cell and those of a prismatic zinc-air cell in accordance with the present invention.

The two discharge curves are shown in FIG. 6. The zinc-air cell (solid curve) lasted for 110 hours, versus 32 hours for the conventional AA cell (dotted curve), a multiple of 3.4. Delivered capacity was 6.5 Ah for the zinc-air cell versus 1.8 Ah for the conventional AA cell.

EXAMPLE 2

This Example demonstrates the use of the prismatic cells of the present invention to provide a 6-cell battery that would be suitable for use with electronic equipment, for example, a notebook computer battery.

The six cells used were approximately 3.4 inches wide by 3.95 inches long by 0.6 inches thick and were mounted vertically side-by-side (i.e., two 3-cell side-by-side stacks) in a test fixture, the overall dimensions providing a battery of approximately 8.5 inches high by 11 inches wide. This orientation was selected to mimic a battery that could be attached to the top outside of the display of a notebook computer in use.

Each cell was constructed as follows:

Cathode Frame

Machining. The cathode frame was machined from a solid clear acrylic plastic block 3.4 inches wide by 3.95 inches long by 0.34 inches thick. A 3.2 inch wide by 3.75 inch long by 0.24 inch deep first recess was machined into the block, leaving the frame with 0.10 inch thick walls at the sides and a 0.10 inch thickness across the face. A second recess 2.9 inches wide by 3.4 inches long by 0.05 inches deep was machined into the frame. Fifty-six (56) air entry holes, each 1/16 inch in diameter, were drilled on evenly spaced centers across the exterior face. A 1/16th inch wide by ¼ inch long slot was formed in one corner of the frame.

Subassembly. A 2.9 inches wide by 3.4 inches long by 0.05 inch thick piece of woven polypropylene mesh (McMaster-Carr Stock #9275744) was inserted into the second recess, flush against the interior of the frame. A 3.2 inches wide by 3.75 inches long by 0.020 inch thick piece of oxygen electrode (Electromedia AE-20) was then placed into the frame and bonded in place at the perimeter of the first recess, using epoxy. A ¼ inch wide 1.25 inches long nickel plated terminal strip, previously soldered to one corner of the wire mesh side of the oxygen electrode was fed through the slot in the corner of the frame.

Anode Insert

Machining. A 3.125 inches wide by 3.70 inches long frame was formed using 3/16 inch square, 1/16 inch thick, L-shaped ABS extruded stock, cut at 45° angles at the corners.

Subassembly. A 3.125 inches wide by 3.70 inches long sheet of 100% PVA paper (Johnson & Johnson 7601) was bonded to the wide face of the frame using polyamide adhesive. An anode mix, consisting of a previously mixed formula of 70 weight parts battery grade zinc powder, 30 weight parts KOH, 2 weight parts Nylon-31 floc, and 0.6 weight parts gelling agent, was troweled into the frame. The amount of floc constituted approximately 60 vol% (uncompressed) of a mixture of the zinc, gelling agent and floc, such that the volume of this dry mixture was substantially unchanged upon addition of electrolyte.

Cell Top

Machining. The cell top was machined from a solid clear acrylic plastic block 3.4 inches wide by 3.95 inches long by 0.25 inch thick. Four (4) ⅛ inch diameter gas vent holes were drilled on equally spaced centers through the face of the top. A fifth ⅛ inch diameter terminal wire exit hole was drilled through the cell top in one corner.

Subassembly. Four (4) ½ inch squares of Celgard ® type 2400 membrane were placed over the vent holes and bonded to the interior face of the cell top, using polyamide adhesive. A 3.125 inch by 3.5 inch pad of 0.070 inch thick white Volara ® foam was bonded at its perimeter to the cell top using polyamide adhesive. A 3.125 inch by 3.5 inch piece of expanded copper mesh about 0.020 inches thick (product 4 CU 12-125, Delker Corporation, Branford, Conn.) was then placed on the foam and tacked in place with the tip of a hot soldering gun. A 4-inch long copper terminal wire was then soldered to a previously tinned solder pad at the center of the copper mesh, dressed flat against the copper mesh, and inserted through the exit hole in the corner of the cell top.

Final Cell Assembly

A 3.2 inch wide by 3.97 inch long sheet of PALL-RAI ZAMM-0 oxygen impermeable membrane was placed into the cathode frame against the oxygen electrode. The anode frame subassembly was then placed into the cathode frame against the ZAMM-0 membrane. The cell top subassembly was then placed against the rim of the cathode frame and bonded in place using epoxy cement.

Figure 7:
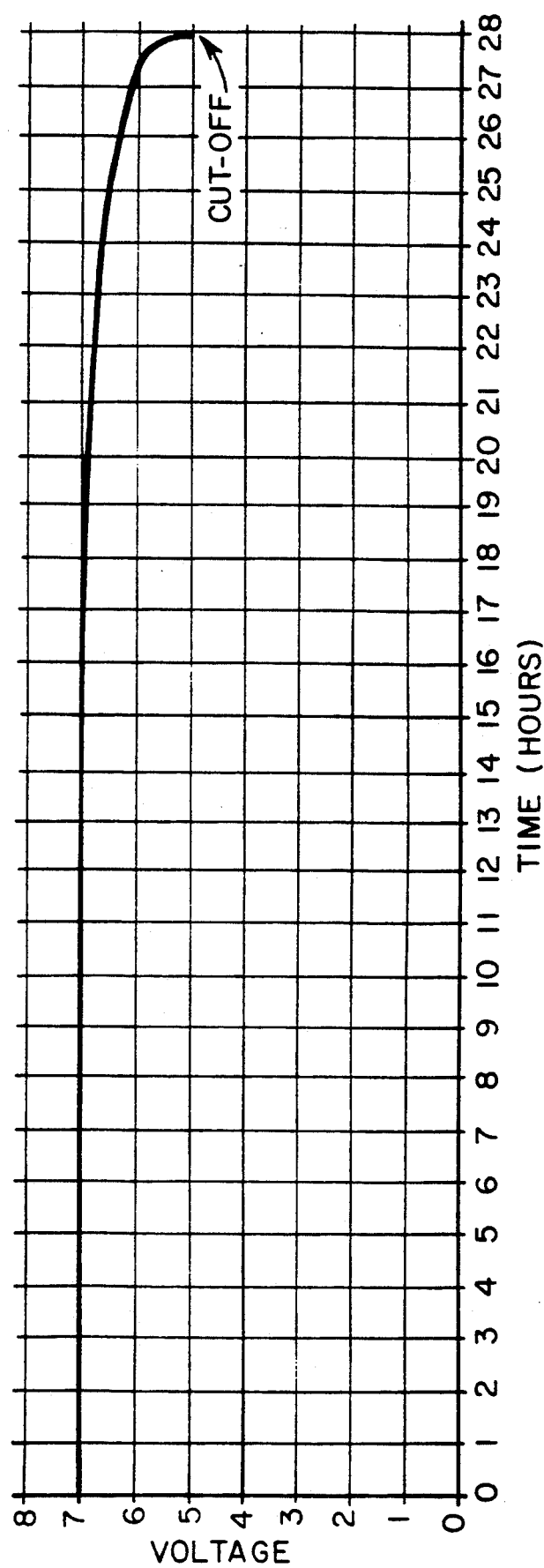
FIG. 7 is a graph of voltage versus time, showing the discharge performance of a battery suitable for a computer application, using the cells of the present invention.

FIG. 7 is a graph of the voltage versus time and hours for the battery. As indicated in FIG. 7, the battery delivered 28 hours of operation at a constant drain rate of 1.2 Amperes to a cutoff, after the 28 hours, of 5V. Zinc utilization for the cells was in the range of 80–90%.

This invention has been disclosed and discussed primarily in terms of specific embodiments thereof, but it is not intended to be limited thereto. Other modifications and embodiments will be apparent to workers in the art. For example, though described in the context of zinc-air cells, cells of the subject invention may be based on other metal-air electrochemistry and may incorporate other metal anodes such as aluminum or magnesium. Moreover, though the design is particularly advantageous in large prismatic cells, the cell may be relatively small and have a cylindrical or button configuration.

We claim as our invention:

1. A prismatic zinc-air cell comprising:
 a prismatic container having one or more oxygen access openings;
 an air cathode disposed in the container in gaseous communication with the oxygen access openings thereby permitting access of oxygen to the air cathode;
 a separator having a first side in electrolytic communication with the air cathode,
 a zinc anode including an electrolyte and disposed in the container in electrolytic communication with a second side of the separator, the separator isolating the air cathode and the zinc anode from direct electrical contact and allowing passage of electrolyte therebetween;
 an expansion space within the container adjacent to the zinc anode and accommodating expansion of the zinc anode during discharge of the cell;
 a foam member generally occupying the expansion space and tending to oppose movement of the zinc anode away from the separator and to collapse upon expansion of the zinc anode during discharge; and one or more vent openings disposed in the container in gaseous communication with the expansion space to minimize pressure increase within the container as the foam member collapses during discharge of the cell.

2. The prismatic zinc-air cell of claim 1, wherein the air cathode, the separator, and the zinc anode are disposed in substantially flat, continuous layers each having a first side and a second side, wherein the oxygen access openings are in gaseous communication with the first side of the air cathode; the first side of the separator is in electrolytic communication with the second side of the air cathode, the first side of the zinc anode is in electrolytic communication with the second side of the separator, and the expansion space is adjacent to the second side of the zinc anode.

3. The prismatic zinc-air cell of claim 1, wherein the zinc anode has at least one side remote from the separator and wherein the expansion space is defined by the remote side of the zinc anode and the container.

4. The prismatic zinc-air cell of claim 1, wherein the zinc-air cell includes hydrophobic membranes covering the vent openings in the container.

5. The prismatic zinc-air cell of claim 1, wherein the collapsible foam member is sized to provide a predetermined amount of pressure on the zinc anode.

6. The prismatic zinc-air cell of claim 1, wherein the collapsible foam member is a closed-cell foam.

7. The prismatic zinc-air cell of claim 1, wherein the collapsible foam member is a polyolefin foam.

8. The prismatic zinc-air cell of claim 1, wherein the zinc anode comprises zinc, an aqueous electrolyte, a gelling agent, and an inert, insoluble volume stabilizer present in an amount sufficient to enhance utilization of zinc in the anode.

9. The prismatic zinc-air cell of claim 8, wherein the cell includes an oxygen impermeable member disposed in the container between the air cathode and the zinc anode and allowing passage of electrolyte between the air cathode and zinc anode.

10. The prismatic zinc-air cell of claim 9, wherein the zinc anode is disposed in a layer and wherein the cell includes one or more anode support members embedded in and extending generally perpendicular to the zinc anode.

11. The prismatic zinc-air cell of claim 1, wherein the cell comprises an anode assembly comprising a rectangular anode frame having peripheral members, the separator is mounted proximate to one end of the anode frame and extends substantially continuously between the anode frame peripheral members, the anode frame and separator defining a trough, and the zinc anode comprises zinc, an aqueous electrolyte, and a gelling agent disposed in the trough in electrolytic communication with a first side of the separator, said anode assembly being disposed in the container such that a second side of the separator is in electrolytic communication with the air cathode.

12. A prismatic zinc-air cell comprising:
a prismatic container having a top wall, a bottom wall, and side walls;
one or more oxygen access openings disposed in the bottom wall of the container;
an air cathode disposed in a layer extending parallel to the top and bottom walls of the container, substantially continuously between the side walls of the container, and having a first side and a second side, wherein the first side of the air cathode is in gaseous communication with the oxygen access openings;
a separator disposed in a layer extending generally parallel to and coextensively with the air cathode and having a first side and a second side, wherein the first side of the separator is in electrolytic communication with the second side of the air cathode;
a zinc anode including an electrolyte and disposed in a layer extending generally parallel to and coextensively with the separator and having a first side and a second side, wherein the first side of the zinc anode is in electrolytic communication with the second side of the separator;
an expansion space within the container adjacent to the second side of the zinc anode and accommodating expansion of the zinc anode during discharge of the cells;
a foam member generally occupying the expansion space and tending to oppose movement of the zinc anode away from the separator and to collapse upon expansion of the zinc anode during discharge, the foam member having a first side which is adjacent to the second side of the zinc anode; and
one or more vent openings disposed in the top wall of the container in gaseous communication with the expansion space to minimize pressure increase within the container as the foam member collapses during discharge of the cell.

13. The prismatic zinc-air cell of claim 12, wherein the zinc anode has at least one side remote from the separator and wherein the expansion space is defined by the remote side of the zinc anode and the container.

14. The prismatic zinc-air cell of claim 12, wherein the zinc-air cell includes hydrophobic membranes covering the vent openings in the container.

15. The prismatic zinc-air cell of claim 12, wherein the collapsible foam member is sized to provide a predetermined amount of pressure on the zinc anode.

16. The prismatic zinc-air cell of claim 12, wherein the collapsible foam member is a closed-cell foam.

17. The prismatic zinc-air cell of claim 12, wherein the collapsible foam member is a polyolefin foam.

18. A prismatic zinc-air cell comprising:
a prismatic container having one or more oxygen access openings;
an air cathode disposed in the container in gaseous communication with the oxygen access openings;
an anode assembly which comprises a rectangular anode frame having peripheral members, a separator mounted proximate to one end of the anode frame and extending substantially continuously between the anode frame peripheral members, whereby the anode frame and separator define a trough, and a zinc anode comprising zinc, an aqueous electrolyte, a gelling agent, and an inert, insoluble volume stabilizer present in an amount sufficient to enhance utilization of zinc in the anode and disposed in the trough in electrolytic communication with a first side of the separator, said anode assembly being is disposed in the container such that a second side of the separator is in electrolytic communication with the air cathode;
an expansion space within the container adjacent to the zinc anode and accommodating expansion of the zinc anode during discharge of the cells;
a foam member generally occupying the expansion space and tending to oppose movement of the zinc anode away from the separator and to collapse upon expansion of the zinc anode during discharge; and one or more vent openings disposed in the container in gaseous communication with the expansion space to minimize pressure increase within the container as the foam member collapses during discharge of the cell.

19. The prismatic zinc-air cell of claim 18, wherein the cell includes an oxygen impermeable member disposed in the container between the air cathode and the zinc anode and allowing passage of electrolyte between the air cathode and zinc anode.

20. The prismatic zinc-air cell of claim 19, wherein the zinc anode is disposed in a layer and wherein the cell includes one or more anode support members embedded in and extending generally perpendicular to the zinc anode.

* * * * *